United States Patent
Dosch

[15] 3,665,386
[45] May 23, 1972

[54] ANTI-HIJACK SYSTEM FOR VEHICLES

[72] Inventor: Thomas J. Dosch, Jupiter, Fla.

[73] Assignee: Electronic Systems Division, a division of Dynamics Corporation of America, Boynton Beach, Fla.

[22] Filed: Dec. 18, 1970

[21] Appl. No.: 99,354

[52] U.S. Cl. ..................................340/53, 340/63, 346/8, 180/114
[51] Int. Cl. ......................................................B60r 25/00
[58] Field of Search..................340/22, 23, 52, 53, 54, 56, 340/63, 64; 73/178, 179, 180; 346/8, 38; 180/114

[56] References Cited

UNITED STATES PATENTS 3,504,337  3/1970  Ekman......................................340/53
2,965,720  12/1960  Bumstead et al....................340/23 X Primary Examiner—Alvin H. Waring
Attorney—Edward H. Loveman

[57] ABSTRACT

An anti-hijack system carried by a vehicle includes means for monitoring the route being traveled by the vehicle and means for continuously comparing the traveled route with a stored preprogrammed route. If the vehicle deviates materially from the programmed route, at any time, vehicle disabling means and an alarm means are actuated. The system includes means for determining the position of the vehicle and means for deactiviating the disabling means when the vehicle speed is below a prescribed low speed. Also included in the system is a means for deactivating the disabling means and thus permit vehicle operation at all speeds at a predetermined time after the vehicle has been disabled.

13 Claims, 3 Drawing Figures

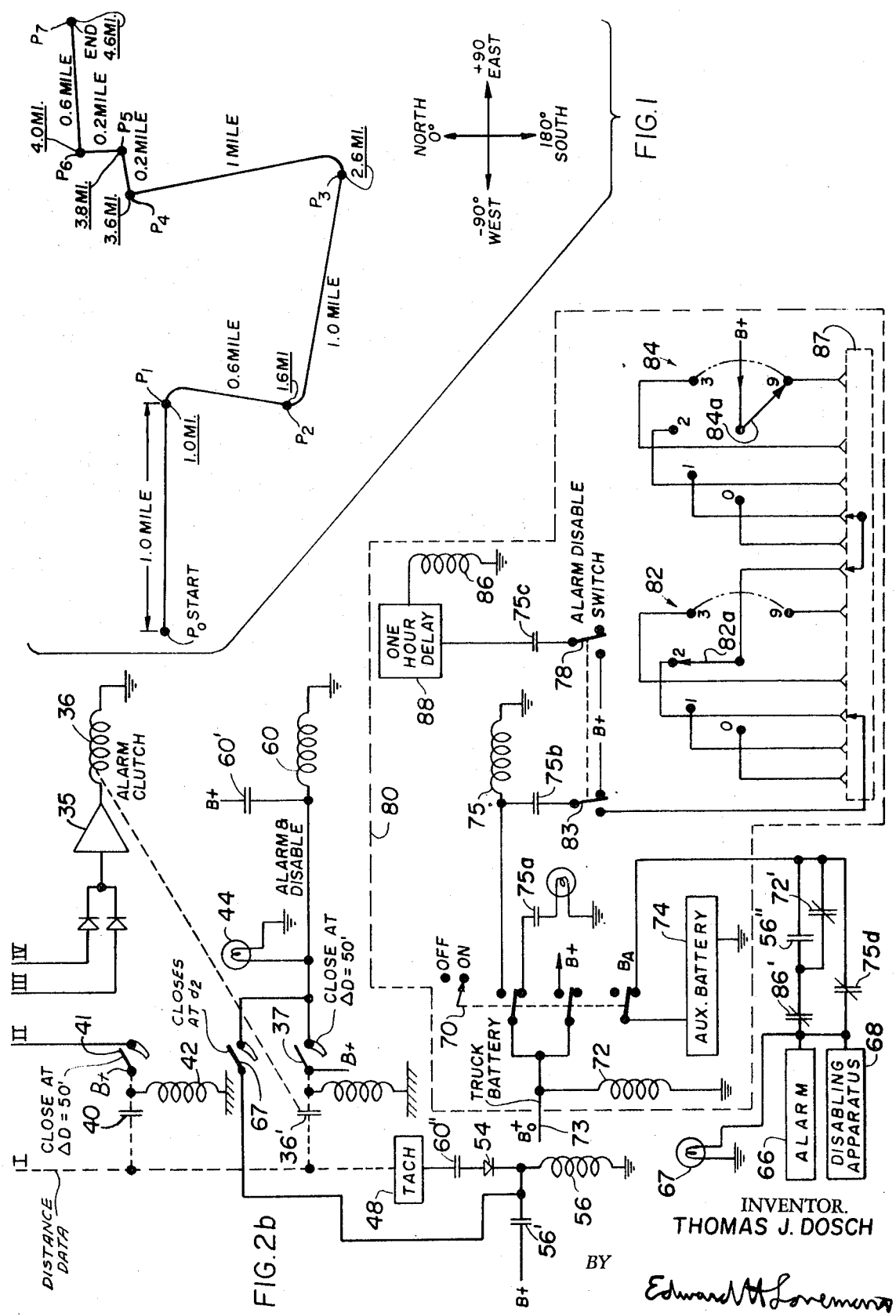

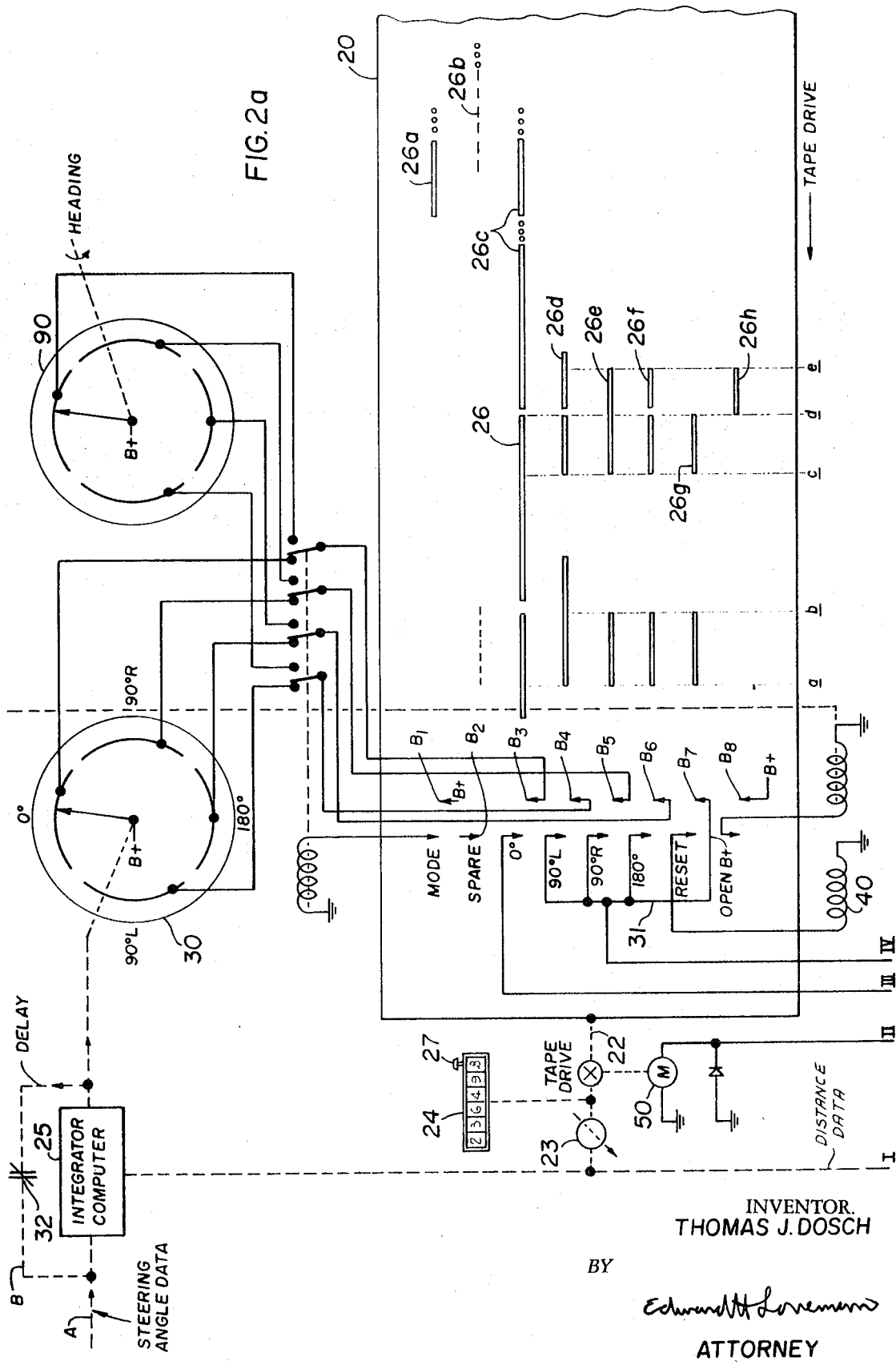

ANTI-HIJACK SYSTEM FOR VEHICLES

This invention concerns an anti-hijack system for vehicles and more particularly involves a system for monitoring the route traveled by a vehicle and comparing key points in the route traveled with a preprogrammed route, and for disabling the vehicle and actuating an alarm if the route traveled differs materially from the preprogrammed route at any of the key points.

The hi-jacking of trucks has become a major economic problem. In the usual hi-jack operation, a gunman commandeers a loaded truck along with the truck driver. This often bypasses the effectiveness of any alarm or security in the truck since the driver is forced to cooperate or is overpowered. The truck is generally driven to an area away from the established truck route where the valuable goods and cargo it contains may be safely removed by the hi-jacker.

Several countermeasures have heretofore been proposed such as alarm or truck disabling devices operated by the truck driver, but they involve greatly increased risk to the driver and are therefore not feasible. Systems such as radar trackers which track the truck and determine at a central location when the truck deviates from an established route are also not practical where hundreds of trucks are on the road at any one time. Radio transmission systems wherein the truck is in constant radio communication with a central dispatching station are also not practical because loss of signal from the truck may be due to any one of a number of reasons, such as failure of the transmission equipment, signal interference, etc. In addition, the hi-jacking generally cannot be forestalled since it is very difficult to quickly locate a truck is the signal is lost. Investigation has shown that any system in which constant communication is required between the truck and a central station with monitoring from the central station is in general not economically feasible since it is a horrendous task to monitor the changing whereabouts of large numbers of trucks at widely scattered points. The use of radio transmission by a truck is also objectionable due to the ease with which the equipment may be sabotaged and with which signal transmission may be jammed or interrupted.

The present invention takes a different approach to the problem and provides a self-contained system on a vehicle such as a truck traveling along a prescribed route which will disable the truck automatically in the event the truck deviates laterally beyond certain allowable limits from the prescribed route. According to the invention the route to be traveled is preprogrammed on tape, i.e., the route program or key elements of the route such as turning points or directional headings are stored on a tape and the tape is installed in the truck. Monitoring means in the system detect lateral deviations of the truck from the preprogrammed route or from the key elements of the route program and actuated alarm and truck disabling means automatically. Further means are provided for preventing disabling of the truck in the event that the actual route traveled deviates in minor, limited ways from the prescribed route in emergencies, detours, etc.

Accordingly, it is a principal object of the present invention to provide an anti-hijacking system for a vehicle wherein information concerning the desired vehicle route is located within the vehicle and monitors the route traveled by the vehicle.

It is another object of the present invention to provide an anti-hijacking system for a vehicle which disables the vehicle automatically in the event the vehicle deviates from a preselected route.

Another object of the present invention is to provide an anti-hijacking system of the type described wherein minor deviations from the prescribed route will not disable the vehicle.

These and other objects and many of the attendant advantages of this invention will be readily appreciated as the same becomes better understood by reference to the following detailed description when considered in connection with the accompanying drawings in which:

FIG. 1 is a diagram explaining the general principles of the invention;

FIG. 2a is an initial portion of a diagram of a system embodying the present invention showing a means for driving a tape containing the programmed route and the means for comparing the actual route traveled by the vehicle; and FIG. 2b is a final portion of a system embodying the present invention showing the switching means for disabling the vehicle.

Referring now to the drawings wherein like reference characters designate like or corresponding parts throughout, there is illustrated diagrammatically in FIG. 1 a prescribed route to be traveled by a vehicle such as a truck starting at point Po. The truck is to travel 1.0 mile in an easterly direction to point P1, then turn right and travel 0.6 mile south to point P2, then turn left and travel southeast 1.0 mile to Point P3, then north 1.0 mile to point P4, etc. to points P5, P6, P7 where the route ends (underscored numbers represent cumulative miles traveled to each point from Po). Thus in the embodiment disclosed the heading changes of the truck are checked during portions of the route where the heading of the truck is essentially constant over an appreciable distance. For example, in FIG. 1, it may be required that between the points Po and P1, i.e., between 0.0 miles and 0.9 miles the truck must be headed +90° ±30, and between point P1 and P2, i.e. from 1.1 miles to 1.5 miles the truck must be headed 180° ±30, and similarly for distances between points P2 – P3, P3 – P4, . . . P6 – P7. It should be noted that the truck is not required to have any specified or particular heading in the area of the turns (the points P1 – P6), to thus permit manuvering which may be required thereat. Minor deviations of the truck from the prescribed route will not result in disabling the truck or actuating its alarms. Such circumstances may arise, for example, when a truck has to make a sharp turn out of a lane to avoid a stalled vehicle ahead or when the truck driver turns off the road to stop for lunch. The system permits a heading error to persist for only a limited distance, for example, about 100 feet or 200 feet at the most.

In the event of an unavoidable unexpected detour outside of the preprogrammed route, the truck is permitted to deviate for a limited distance without actuating the alarm or disabling apparatus, provided that the truck travels at a very low speed while doing so. This speed is preferably not more than 10 miles per hour, but may be set in certain circumstances as high as 15 miles per hour.

It may sometimes happen that the truck must continue on a detour of extended length whereupon the truck will be disabled and the driver must communicate by telephone with a central dispatcher's office. The driver will receive a code from the dispatcher which he will insert into the system on his truck. This will serve to deactivate the disabling system following a predetermined time delay such as one hour. Thereafter the driver can proceed at normal speed on the unprogrammed route without interference by the system. The delay of 1 hour will allow sufficient time for police authorities to be notified so that the situation may be investigated. This time delay also prevents a hijacker from obtaining the code from the dispatcher under threat of violence to the driver and then driving off with the truck immediately. The code mentioned above may be one of a number of printed circuit cards stored under lock in the truck, and changed by the truck dispatcher before each trip taken by the truck and thus when the driver communicates with the dispatcher he will be told a sequence of digits which he can insert into the system by means of a plurality of switches. Since the system employs dead reckoning to determine distance traveled, errors in measured distance vs. actual distance traveled will accumulate, and therefore, the system includes means for resetting the tape to coordinate the turning point inscribed on the tape with the actual location of the truck on the route.

It should be understood that the system may employ one of many well known means for obtaining position, directional heading changes, or heading of the truck. For example, a steering wheel angle transducer and an integrator, a magnetic compass, a gyrocompass, a rate gyro and integrator, electromagnetic sensing means cooperating with, for example, magnetizable rods burried in the pavement, etc. In the specific embodiment now to be explained with particular reference to FIG. 2, a and b the directional heading changes are obtained from a steering wheel angle transducer and an integrator.

The system shown diagrammatically in FIG. 2 a and b is intended to disable a truck in which it is installed and to actuate an alarm at any time that the truck deviates appreciably from the preprogrammed route. The route is programmed on a tape 20 as a series of turns which the truck is expected to make when following the prescribed route. The tape is driven from the drive mechanism of the truck via a suitable tape drive coupling 22, indicated by a dashed line in FIG. 2a which is similar to the flexible shaft of a conventional odometer. The tape movement is proportional to the actual distance traveled by the truck and an odometer 24 connected to the tape drive coupling 22 indicates the measured distance traveled from any given point. The odometer 24 may be set to zero by a manual control 27 and has a manual ratio adjustment knob 23. The programmed route is stored on the tape as slits or series of holes 26 in a plurality of tracks 26a–26h respectively labelled MODE, SPARE, 0°, 90°L, 90° R, 180°, RESET and OPEN B+.

If, for example, the programmed route as stored on the tape indicates that a right turn of 90° at 1.0 miles from the starting point is required, as shown in FIG. 1, the truck will be disabled in a predetermined way unless it does in fact turn approximately 90° right at a point approximately 1 mile from the starting point. Similarly, if no turn was indicated by the route program on the tape, and the truck turned, the truck would be disabled. Safeguards are provided as explained below, so that minor deviations from the programmed route will be prevented from disabling the truck. For example, a truck may make a turn out of a blocked lane and turn into an open lane. Such an unpredictable maneuver cannot be preprogrammed and will not result in disabling the truck.

As hereinabefore mentioned the directional heading changes of the truck are determined from a steering wheel transducer (not shown) and an integrator-computer 25. That is, the angle the truck turns through is determined as the integral of steering angle and distance traveled during the turn. The determination is made by the integrator-computer 25 from data corresponding to the steering angle A which is a function of the angle turned through by the truck steerable wheels and which data is fed into the input of the integrator-computer. Feedback B shown around the integrator-computer 25 is used to prevent accumulation of bias errors in the integrator-computer. The distance data D fed to the integrater-computer 25 is proportional to revolutions of the truck wheels. Changes in the data angle which appear at the output of the integrator-computer 25 correspond to truck heading changes and are fed to an encoder 30 which may be a conventional brush or optical type encoder. The encoder digitizes data angle θ to one of four discrete values corresponding respectively to turns of 0°, 90°R (90° right turn) 90°L (90° left turn,) and 180°.

Detection of a turn is used to reset the tape to correspond to the exact distance preplanned for that turn. This feature described in further detail below, is used to minimize the accumulation of large discrepancies between the indicated distance on the tape and the measured truck distance traveled. Means further described below are provided to simplify the manner in which a driver may complete a prescribed truck route in the event that the truck has to make an unscheduled detour. In such an event, the truck is enabled to drive off the prescribed route for a preselected distance provided that the truck speed is kept below a predetermined minimum of 10 miles per hour, or perhaps at most, 15 miles per hour. If the truck travels the preselected distance, the truck will be disabled. Normal roadway driving speed may be resumed and the disabling mechanism may be disarmed by insertion of a special code into the system by the driver who will obtain this special code by communication with a central dispatcher via radio or telephone as hereinbefore described. After the driver inserts the special code, a predetermined time must elapse before the truck may be driven with its disabling system deactivated or disarmed.

The operation of the system will now be described in further detail with reference to FIG. 2a. The steering angle A is assumed to be proportional to the curvature of the path the truck is traveling and is obtained by the steering angle transducer (not shown) linked to the steering mechanism of the truck. This steering angle A is integrated with respect to distance D to produce the data angle θ changes in which represent the computed truck heading changes. Changes in angle θ are used as an indication of discrete truck turns at a corner, for instance. Provision is made in interpreting angle θ or in generating angle θ to prevent gradual accumulation of bias induced errors in the integrator-computer's output from appearing as a turn. In the system of FIG. 2, only turns in the order of 45° are treated as significant, provided such turns occur in a relatively short path length. For example, in turning a corner of 90° in city driving, a total travel in the order of 100 feet may be expected to be near the maximum allowable. Accordingly, the specific system shown utilizes a feedback B around the integrator-computer 25 which is proportioned to give a "distance constant" in the order of 500 feet to prevent error accumulation. A normally closed clutch 32 is provided in the feedback path B which may be opened to remove the feedback when the truck is in an area such as an unloading or loading zone where a large number of non-programmed turns may be made in a relatively short distance.

In the system of FIG. 2, the data angle θ is digitized by an encoder 30 into four discrete values, nominally 0°, 90°R (+90°), 90°L (−90°) and 180°. The digitized value of θ is then compared with the preprogrammed value of θ stored on the tape which is assumed to move from right to left (viewed in FIG. 2a) as a function of increasing truck distance along its programmed route. The route program is essentially stored in the four tracks 26c–26f designated 0°, 90°L, 90°R and 180° adjacent to brushes B3 – B6 which are illustrated diagrammatically. The brushes are arranged in pairs each associated with a given track. The brushes in each pair are arranged to make contact with each other through each slit or series of the holes 26 in one of the tracks 26a–26h. The brushes of a pair make contact when a slit or a hole is present in its associated track and make no contact when an imperforate section of the track is present at the brushes. The brushes in each pair should be visualized as being adjacent one another on opposite sides of the tape. In the tape position shown all brush contacts are open. During normal operation, however, this will not occur. To understand this operation consider for example that the truck route is initiated when the perforations in the 0° turn track 26c are in such a position that the 0° brush contacts B3 are closed, and assume further that the truck is traveling on a straight portion of its route at this time. In this position of the tape, assume that the integrator-computer angle θ is initially near zero, so that B+ voltage is supplied to the 0° sector of the encoder 30. The voltage will be applied across the closed brush contacts B3 to an inverter amplifier 35 associated with an alarm clutch coil 36. The action of the inverter amplifier 35 is to produce zero output for a positive input and to produce a positive output for a zero input. In the present example, the output of the inverter is therefore zero, and the coil 36 of an alarm clutch 36' is not energized. Suppose now that the programmed route of the truck is as follows:

Route Program a–b: planned 90° left turn somewhere between a and b on the tape;

c–d: planned 90° right turn somewhere between c and d on the tape, into loading zone;

d–e: maximum planned distance during unloading operation.

According to the route program, the next programmed operation of the truck will be a left turn of 90° that is assumed to occur somewhere between points a and b on the tape. The distance represented between points a and b is a function of the uncertainty in measuring the distance to the programmed left turn. If, for example, the truck traveled 50 miles without turning, with an accuracy of 2 percent in the measurement of distance the uncertainty in where the actual turn will occur will be ± 1 mile. Therefore, each turn automatically initiates actions which resets the tape to a nominally correct value. In the example being given, assume that the RESET brush contacts B7 have been closed by motion of the tape to the left so that a perforation on track 26g reaches the brushes B7. Since the truck has not yet turned, there is no voltage applied on a lead 31 and consequently no voltage is applied to the contacts B7 or to a coil 40 of a turn clutch 40' (FIG. 2b) in circuit therewith. When the truck finally turns, whether left or right, the B+ voltage appears on the lead 31 and is applied to the coil 40. After the heading change has persisted for approximately 50 feet after the turn indicated by the encoder 30, a switch 41 closes and the B+ voltage associated therewith energizes a motor 50 which drives the tape further to the left until such time as the reset brush contacts B7 open at the end of the perforation in track 26 g. This deenergizes the turn clutch coil 40 disengaging the clutch 40' under the bias of a spring 42. With the tape driven to point b, let us first assume that the truck has correctly turned 90° left. In this case the output from the encoder 30 is such that the 90°L (90°left turn) sector is energized, and voltage will then be applied through the 90° L brush contacts B4 to the inverter 35 to produce zero output at an alarm clutch coil 36. In this case since the left turn has been correctly made, the alarm clutch 36' remains deactivated and the truck is not disabled.

Let us assume next that the truck turned but did not make a proper 90° left turn. Instead, assume that it turned 90° right. In this case, the 90°R (90° right turn) sector of the encoder 30 will be energized, but there will be no path for current to flow to the inverter 35. Therefore, the alarm clutch 36' will be energized and after 50 feet of travel the alarm clutch contacts 36 will be closed initiating the alarm and disable cycle described below. Next consider the possibility that the truck did not turn at all when it should have. In this case, the required reset action of advancing the tape would not have occurred. However, distance data from the forward motion of the truck will eventually drive the tape to the point b where continued straight line motion of the truck opens the 0° brush contacts B3. At this point, the action will be same as described for an incorrect turn and the alarm and disable cycles will be initiated.

In the above description, mechanically driven contacts were provided for the turn and alarm clutches. These contacts closed after the corresponding clutch was actuated and the truck traveled 50 feet from the instant when the clutches were so activated. This distance of 50 feet is nominal, and in general will not be less than fifty feet nor more than 200 feet. If there were no such distance delay, the actions initiated by energizing the turn clutch 40' or the alarm clutch 36' could result from a momentary turn of the truck such as turning from one lane to another to avoid a parked car, or turning into a parking lot for a temporary stop, such as a lunch stop. By requiring that the truck travel an appreciable distance on a new heading before the alarm can be actuated, false alarms are avoided.

The operations involved in actuating the alarm and disabling apparatus will now be described. The first action following closure of the alarm clutch 36' will be the lighting of a warning lamp 44 signaling the driver to slow down. The truck is allowed to travel a finite distance d2 even on the wrong heading provided that the truck speed is kept below the nominal speed of 10 miles per hour. This will allow the truck driver to continue his journey for the aforesaid additional distance d2 during which time the truck must arrive at a place the driver can communicate with a central dispatcher and deactivate the alarm system in a manner to be described below. After the truck has traveled the distance d2, it will be disabled. Thus simultaneously with the lighting of lamp 44, a relay coil 60 is energized and locked up through its own contacts 60'. If the truck speed is over 10 miles per hour, the voltage obtained from a tachometer 48 passes through a pair of contacts 60'' and since the voltage from the tachometer 48 at a speed above 10 miles per hour is greater than the avalanche voltage of a zener diode 54, a relay coil 56 is energized and locks up or latches through its own contacts 56'. A 10 second delay is allowed to permit the driver time to slow the truck. Closing of a pair of contacts 56'' in turn sounds alarm 66, lights a signal lamp 67, and actuates a truck disabling apparatus 68. Disabling of the truck can be accomplished by shutting off the fuel supply if a diesel engine is employed, or by shutting off the fuel supply or deactivating the ignition system if a gasoline, internal combustion engine is employed. Other more drastic disabling methods may be used such as disconnecting a cam shaft from the main crank shaft, locking the transmission, blowing out one or more tires, etc. The circuit associated with the alarm and disabling apparatus 66, 68 is described further below. If the truck speed is below 10 miles per hour then the truck may continue traveling until the distance d2 has been reached, whereupon a switch 67 closes and a voltage therefrom is applied directly to the relay coil 56 thereby closing the contacts 56' and 56'' to initiate the action hereinabove described.

Provision is made for disabling the alarm system, during times the truck is in a garage and during times when it is desired that the driver have a limited ability to disable the system under emergency conditions. A typical day's operation might start with an ON-OFF switch 70 in the OFF position. A relay 72 has contacts 72' which disable the system when the main B+ battery output is lost. The main truck battery is used to reduce drain on a protected auxiliary battery 74.

When the truck is ready to start its route, the ON-OFF switch 70 is thrown to ON position. A relay 75 will then be held up only through its own contacts 75b via a make before break switch 83 which is mechanically connected to an Alarm Disable switch 78. Battery voltage Bo+ and Ba+ are now available to the system from a main battery 73 and an auxiliary battery 74. A cover is locked onto switch box 80 containing the ON-OFF switch 70 and the alarm disable switch 78. If, during truck deliveries, a major detour occurs, the driver will proceed at the prescribed low speed (maximum 10 miles per hour) for a distance d2 during which time he must reach a telephone and communicate with the central truck dispatcher for after reaching the distance d2 the truck will be disabled. The truck driver will obtain a code from the dispatcher which he will insert into a pair of decade switches 82 and 84 (by setting a switch arm 82a and 84a respectively). This code will in general be different for each truck and will be changed each day. The code can be changed by the dispatcher changing a plug-in printed circuit card 87 before the truck leaves for its journey. The truck driver will thus set the switch arms 82a and 84a to the proper positions in accordance with instructions from the dispatcher and throw the alarm disable switch 78 from the solid line position shown in FIG. 2b to the dashed position. The relay 75 will continue to hold itself up through its contacts 75b with the B+ voltage supplied through the decade switches via the make before break switch 83. In addition, B+ voltage energizes a relay 86 through the normally open relay contacts 75c after a 1 hour delay imposed by a time delay circuit 88. When the hour has elapsed, the relay 86 is energized, thereby opening relay contacts 86, associated with the alarm and disabling apparatus 66, 68. It will be noted that a breakage of connections associated with the alarm and disabling apparatus bypasses all contacts and directly actuates the alarm and disables the truck. If the driver inserts an incorrect code, the relay 75 drops down, disabling the truck when the alarm disable switch 78 is thrown.

If desired, a heading reference device 90 may be added to the system to replace the source of steering wheel turn data A, or to supplement this source. The heading reference device may be a magnetic compass or a gyroscopic reference device as hereinbefore discussed. During those portions of the truck route where such a heading device is to be used, the MODE track 26a on the tape is used to permit closure of brush contacts B1. This will switch off the data angle θ output of the integrator-computer 25 from the encoder 30 and instead will apply the heading reference supplied by the device 90. The compass type heading of the device 90 may have four or more discrete directional segments.

The system described above accomplishes its basis purpose of frustrating hijacking of a truck by effectively comparing key elements of the preprogrammed route on the tape 20 with key points of the actual route traveled. Such key points are located at turning points of the route traveled. The odometer is automatically set to zero for each part of the route after each turn is made. The alarm is actuated and the truck is disabled for incorrect turns or for failure to make a programmed turn. Delay means allow for minor turns off the programmed route at high speeds. Deactivation of the alarm and disabling apparatus is effected when speed is kept under 10 miles per hour for a limited distance so that detours and other emergency maneuvers may be made.

The alarm apparatus may be a siren or other acoustic device. In addition it may include an automatically operated transmitter broadcasting on a police call frequency, or the like.

It should be understood that the foregoing relates to only a preferred embodiment of the invention, and that it is intended to cover all changes and modifications of the example of the invention herein chosen for the purposes of the disclosure, which do not constitute departures from the spirit and scope of the invention.

THE INVENTION CLAIMED IS:

1. An anti-hijack system for a vehicle traveling a prescribed route, comprising
   storage means on said vehicle for storing a route program corresponding to said prescribed route;
   generating means on said vehicle for generating data corresponding to the position of said vehicle a comparison means for comparing the data from said generating means with said stored route program to detect a material deviation of said vehicle from the prescribed route; and
   vehicle disabling means connected in circuit with said comparison means for disabling said vehicle when said material deviation of said vehicle from said prescribed route is detected.

2. An anti-hijack system as defined in claim 1, further comprising delay means for delaying activation of said vehicle disabling means when said vehicle deviates from said prescribed route for a distance not exceeding a predetermined distance.

3. An anti-hijack system as defined in claim 2, further comprising a second delay means for deactivating said vehicle disabling means for a predetermined distance provided said vehicle travels at a speed no greater than a predetermined maximum low speed to permit said vehicle to travel off said prescribed route.

4. An anti-hijack system as defined in claim 1, further comprising interchangeable coding means insertable in circuit with said vehicle disabling means for deactivating said vehicle disabling means, and third time delay means connected in circuit with said vehicle disabling means for deactivating said vehicle disabling means, and third time delay means connected in circuit with said vehicle disabling means to prevent deactivation of said vehicle disabling means for a predetermined time after insertion of said coding means in circuit with said vehicle disabling means.

5. An anti-hijack system as defined in claim 1, further comprising alarm means connected in circuit with said comparison means for actuation when said vehicle is disabled by said vehicle disabling means.

6. An anti-hijack system as defined in claim 1, wherein said storage means comprises a tape having said route program stored in a plurality of tracks, and means for advancing said tape in coordination with the forward distance traveled by said vehicle, said comparison means comprising means for scanning said tracks to detect key points of said stored route program thereon while said tape is advanced.

7. An anti-hijack system as defined in claim 1 wherein said comparing of said data with said stored route program occurs at a prescribed turning point of said vehicle, said system further comprising means for detecting any difference between the occurrence of said actual turning point of said vehicle and the turning point prescribed on said stored program, and means for resetting said stored route program so that said route program prescribed turning point occurs substantially simultaneously with said actual turning point.

8. An anti-hijack system as defined in claim 6, wherein each of said key points of said stored program corresponds to a prescribed turning point of said vehicle, said system further comprising means for detecting any difference between the occurrence of said actual turning point of said vehicle and the scanning of a corresponding prescribed turning point, and means for resetting said tape so that said scanned prescribed turning point occurs substantially simultaneously with said actual turning point.

9. An anti-hijack system as defined in claim 8 wherein said resetting means comprises a drive motor arranged to advance said tape independently of the forward distance traveled by said vehicle and connected in circuit with said vehicle scanning means for advancing said tape, so that the beginning of the distance traveled by said vehicle following each turn of said vehicle corresponds with the start of scanning of said corresponding portion of said route program stored on said tape.

10. An anti-hijack system as defined in claim 1, wherein said means for generating data corresponding to directional headings of said vehicle comprises a gyroscopic reference device.

11. An anti-hijack system as defined in claim 1, wherein said means for generating data corresponding to directional heading comprises
   measuring means for producing a distance data signal indicative of the distance traveled by said vehicle,
   transducer means for producing a steering angle signal representing the angular turning of said vehicle; and
   an integrator-computer arranged to receive said distance signal data and said steering angle signal and to generate output data representing headings corresponding to an integration of said received distance data and steering angle signals.

12. An anti-hijack system as defined in claim 11, wherein said storage means comprises a tape having said route program stored in a plurality of tracks, and means for advancing said tape in coordination with the forward distance traveled by said vehicle, said comparison means comprising means for scanning said tracks to detect key points of said stored route program thereon while said tape is advanced.

13. An anti-hijack system as defined in claim 12, wherein said comparison means further comprises data encoder means connected in circuit with said integrator-computer, said track scanning means being also connected in circuit with said integrator-computer to effect comparison of said key points of said stored program with corresponding key points of the route actually traveled by said vehicle.

* * * * *